United States Patent [19]

Versluis et al.

[11] 3,747,308
[45] July 24, 1973

[54] GAS TREATING APPARATUS

[75] Inventors: Roeland Versluis; Jacob Schinkelshoek; Pieter J. Schuurman, all of The Hague, Netherlands

[73] Assignee: Shell Oil Company, New York, N.Y.

[22] Filed: Feb. 1, 1972

[21] Appl. No.: 222,505

[52] U.S. Cl. .................................... 55/387, 55/512
[51] Int. Cl. ........................................... B01d 53/04
[58] Field of Search ................ 55/73, 74, 387, 483, 55/484, 512, 521

[56] References Cited
UNITED STATES PATENTS
3,319,401   5/1967   Bogandys .............................. 55/387
3,501,897   3/1970   Van Helden et al .................... 55/73

Primary Examiner—Charles N. Hart
Attorney—Leonard P. Miller et al.

[57] ABSTRACT

Apparatus for contacting a gas mixture containing undesirable compounds with a solid material suitable for removing such compounds which comprises a housing in which is situated one or more containers comprising a sheet of a gas-permeable material folded into a plurality of S-shaped creases into which are inserted horizontal and vertical ladder-type constructions which provide support for the gas-permeable sheet and form chambers for the solid material and open gas channels through which the gas mixture is passed.

7 Claims, 5 Drawing Figures

PATENTED JUL 24 1973 3,747,308

3,747,308

GAS TREATING APPARATUS

BACKGROUND OF THE INVENTION

1. Field of the Invention

This invention relates to an apparatus for treating gas mixtures containing undesirable compounds such as sulfur oxides, by contacting the gases with a solid material suitable for removing such compounds.

2. Description of the Prior Art

It is well known that certain gas mixtures such as flue gases and waste gases from sulfuric acid plants, nitric acid plants and ore-roasting furnaces contain sulfur oxides and other undesirable compounds which give rise to air pollution if freely discharged into the atmosphere. It is also known that it is possible to remove at least some of these noxious compounds by contacting the gas mixture with a solid material which may be a catalyst, an absorbent or an acceptor. The undesirable compounds are thereby bound either physically or chemically to the solid material and are thus removed from the treated gas mixture. (In the present application the term acceptance is meant to denote the physical or chemical binding of a gas by a solid substance, and the term acceptor a solid substance which is capable of binding a gas. The gas may be gaseous compound or a gaseous element.)

For example, sulfur oxides may be removed from flue gases by contacting flue gases containing one or more sulfur oxides as well sa oxygen with an acceptor which contains a metal supported on a carrier material. Processes of this type may be conducted at flue gas temperature, i.e. at about 200°–500°C. During contact the sulfur dioxide and/or trioxide is accepted by the metal. The purified gases do not give rise to atmospheric pollution and may, moreover, be discharged via a stack without being heated.

The metal compound formed during acceptance may subsequently be decomposed with the aid of a reducing gas. By this "regeneration" acceptor material which is capable of acception new amounts of sulfur oxides is formed again. Moreover, a gas is formed which is considerably richer in sulfur dioxide than the non-purified flue gas. This sulfur dioxide rich gas may be used, for instance, for the production of sulfuric acid or elemental sulfur.

An attractive apparatus for the removal of sulfur oxides from flue gases is described in U.S. Pat. No. 3,501,897 to Van Helden et al. This apparatus comprises one or more open gas channels running parallel or substantially parallel to each other and having walls designed and built such that acceptor material presented on, in and/or behind said channel walls is, for the purpose of accepting harmful contaminants, freely accessible to a gas mixture passed through the open gas channels. An advantage of this type apparatus is that it is not clogged up by solid particles such as soot and fly ash which may be present in flue gases. Thus, the apparatus may remain in operation for long periods of time. This favorable result is not obtained if the flue gases are passed through a fixed bed of acceptor particles, because a fixed bed becomes rapidly clogged up and must be taken out of service after relatively brief periods of operation. The gas-permeable walls employed in apparatuses of the above type are generally relatively thin and hence must be reinforced or supported by some means to prevent buckling or collapse. It is, of course, highly desirable that whatever form of support is used, the supporting means not interfere with the free accessibility of the gas to the solid acceptor material.

SUMMARY OF THE INVENTION

The present invention provides a highly efficient apparatus of the type described in the above-mentioned patent and which additionally has a very sturdy structure. The improved apparatus of the invention comprises a housing provided with a gas inlet and outlet having disposed therein a system of containers for the solid material utilized to treat the gas mixture. The containers comprise a sheet of a gas-permeable material folded into a plurality of S-shaped creases each of which have two spaces into which are inserted a ladder type construction of horizontal and vertical bars. These ladder-type constructions provide support for the gas-permeable sheets and form chambers for solid material and gas channels which are in open fluid communication with the gas inlet and outlet provided in the housing.

DESCRIPTION OF EMBODIMENTS

Figure 1:
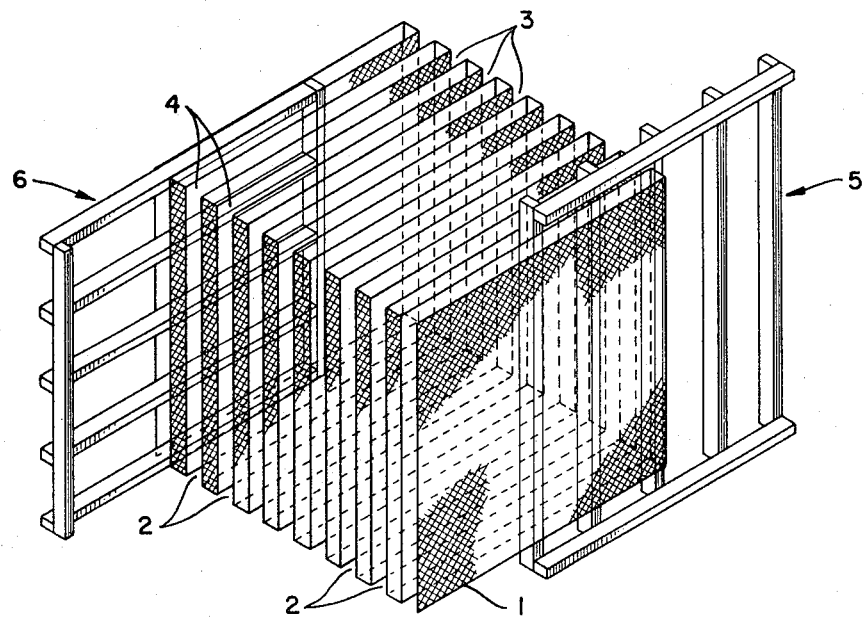
FIG. 1 is a perspective view of a container in accordance with the invention showing the insertion of the ladder-type constructions into the spaces of the S-shaped creases.

In a preferred embodiment of the invention, the container for the solid material is prepared from a long strip of metal gauze folded into S-shape creases in the form of a rectangular block and is situated in a rectangular housing having the form of a bottomless box. In this embodiment the ladder-type construction inserted in one space of the S-shaped crease is rotated 90° with respect to the ladder-type construction in the other space of the S-shaped crease.

In a particularly preferred embodiment, a ladder-type construction having horizontally running bars is employed to form the chambers for the solid material, while a ladder-type construction having vertically running bars form the open gas channels. It is preferred that the ladder-type construction employed to form the chambers for the solid material be so constructed that one vertical longitudinal strip of this ladder-type construction extends outside the space of the S-shaped crease and is located opposite the closed side of the following space. Such a construction may be achieved by attaching a longitudinal strip of the ladder-type construction to the bars in the extension of the bars in the same plane thereof, and attaching the other longitudinal strip to these bars at the other end of these bars outside the plane thereof. Preferably, the length of the bars and longitudinal strip attached thereto in the same plane is larger than the depth of an S-shaped crease so that the other longitudinal strip lies free with respect to the closed side of the following space.

Wherever in the above and in the following description mention is made of metal strips with reference to the ladder-type construction, metal rods or metal profiles are also meant.

The ladder-type construction located in a gas channel is preferably so constructed that both longitudinal strips of this ladder-type construction extend outside the space of the S-shaped crease and are located respectively above and below the chamber for solid. In this ladder-type construction both longitudinal strips are attached to these bars at the ends of the bars outside the plane thereof. The length of the bars may be so chosen that the said longitudinal strips close the chamber for solid at the top and/or bottom at the same time.

The chambers for solid of such a container should be filled with solid before this system is placed in the box or before the last side of the box is attached. In the box the folded strip of gauze is carried by one or more supporting beams situated in the lower part of the box. In order to obtain a rigid whole, the strip of gauze folded in S-shaped creases can be compressed and/or connected at more or less regular intervals by welds or by other means with the ladder-type construction placed in these creases.

In order to be able to stack the above-described box-shaped elements in layers in the treating spaces, at least some of the boxes placed in these spaces can be provided with carrying elements at their top and/or bottom side on one lateral face, or on two opposite lateral faces. These carrying elements may, for example, be so constructed that they extend over the upper edge of two adjacent boxes in a lower layer of boxes while at the same time carrying a box from the same layer as the box to which they are attached. They may also be formed by bending both the upper edge and the lower edge of the side wall of at least two opposite lateral faces outwards and towards each other so as to form an L-shape.

The box-shaped elements may be provided with one or more pull rods connecting two opposing metal plates which form the box. This gives the entire assembly extra rigidity.

The retangular block containers are preferably so constructed that the gas channels have a slit width of from 3 to 20 mm and more preferably from 5 to 10 mm, measured at right angles to the boundary walls of the channel. The chambers for solid preferably have a width of from 1 to 15 mm, and more preferably from 3 to 8 mm, measured vertically to the gas-permeable walls of the chamber.

The invention will be more fully understood by reference to the accompanying drawings.

Referring now to embodiment shown in FIG. 1, a long strip of metal gauze 1 having a mesh width such that the solid acceptor material to be used is substantially unable to pass through the openings thereof, is folded into several S-shaped creases 2. A ladder-type construction is placed in spaces 3 and 4 of these creases. The bars of the ladder-type construction 5 in each space 3 run vertically while the bars of the ladder-type construction 6 in each space 4 run horizontally. The spaces containing the ladder-type construction with the horizontal bars form the chambers for solid material while the spaces with a ladder-type construction in which the bars run vertically form the open gas channels. Chambers for solid and open gas channels alternate in the manner shown.

Figure 2:
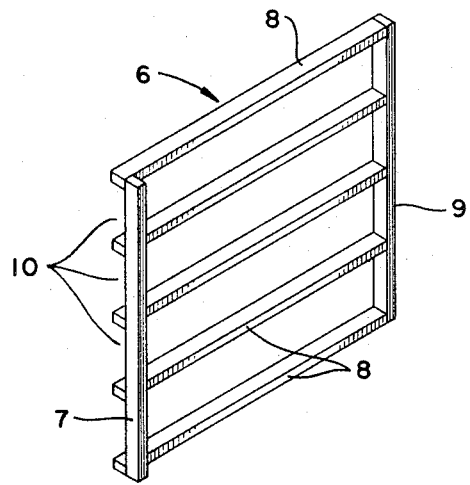
FIGS. 2 and 3 are perspective views of the horizontal and vertical ladder-type constructions.
Figure 3:
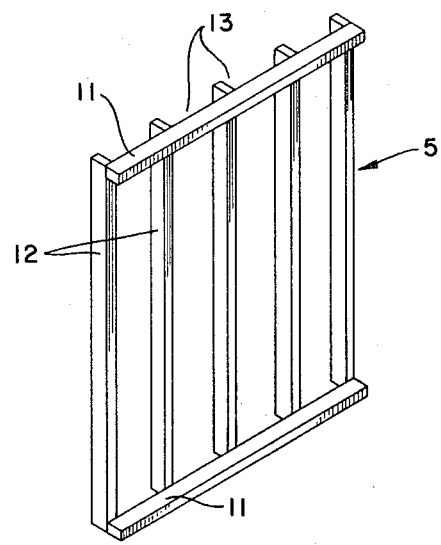

In FIGS. 2 and 3, the ladder-type constructions used in the spaces of the S-shaped creases are shown again. Ladder-type construction 6 is pushed with its side 9 into space 4, and bars 8 are attached by the end to side 9 to facilitate entry of the ladder into the space. The horizontal bars, which may be constructed in, for example, the shape of U-profiles, serve to carry the solid. The other side of the ladder-type construction (designated 7) is attached to the sides of the ends of bars 8, such that when this ladder-type construction is placed in spaces 4, side 7 is located opposite the closed side of following space 3. In this way it is possible to introduce the solid into the chambers through openings 10 between bars 8. Preferably, the bars 8 are of such a length that side 7 is freely located opposite the closed side of the following space.

The vertical ladder-type construction shown in FIG. 3 is so constructed that both sides 11 are located outside the space between the creases. The length of bars 12 may be so chosen that sides 11 seal the adjacent solid chamber both at the top and the bottom. The gases to be treated can now flow upwards or downwards (depending on the direction of flow used) through openings 13 between bars 12 and by diffusion come into contact with the solid in the adjacent solid chambers.

Figure 4:
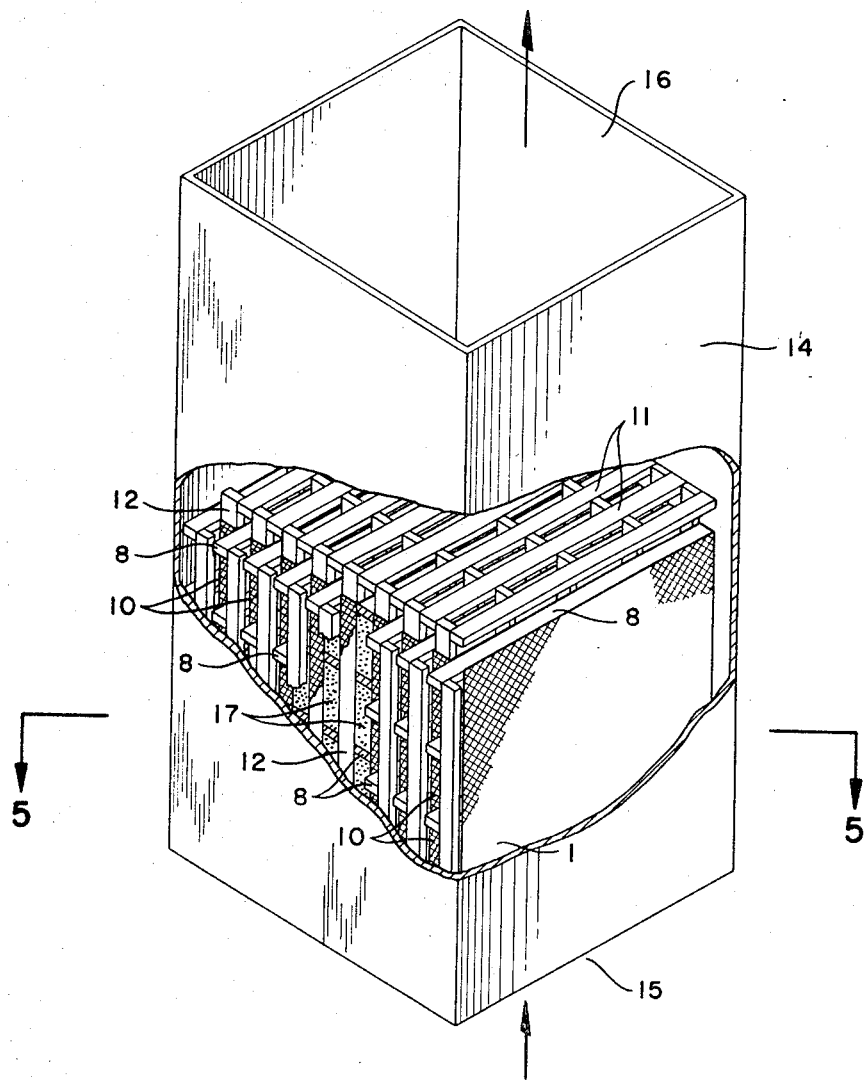
FIG. 4 is a view partly in perspective, partly cut away, of the container of FIG. 1 accommodated in a rectangular housing.
Figure 5:
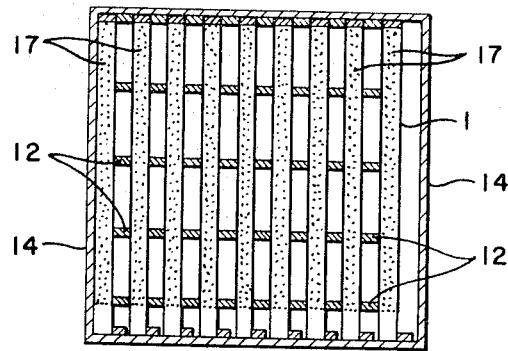
FIG. 5 is a cross-sectional view of the apparatus of FIG. 4 taken along line 5—5.

In FIGS. 4 and 5, the container as shown in FIG. 3 is assembled to form a large box-shaped element. Such elements may be employed individually to treat gas mixtures or may be used in a plurality in a suitable treating space. In the embodiment depicted, the four walls (designated 14) comprise the housing which is provided with gas inlet 15 and gas outlet 16. The flow of gas during the treating (i.e., acceptance) run is indicated by the arrows. During regeneration of the loaded solid acceptor material, the regenerating gas is preferably flowed countercurrently to the flow of gas during acceptance.

As shown, the solid material (designated 17) is contained in the chambers formed by horizontal bars 8. These chambers may be conveniently filled by turning the entire element on one side before attaching the side wall opposite filler openings 10, and introducing the solid material through these openings. After filling the spaces, the fourth side wall is put into place and the element is righted so that bars 8 again run horizontally.

It is preferred that the chambers for the solid material formed by bars 8 alternate with the open gas channels formed by vertical bars 12 to insure adequate contact between the solid material and the gas. Other configurations, however, wherein the chambers and open channels do not alternate are also within the scope of the invention. Likewise while the rectangular arrangement depicted in the drawings is preferred because of the ease of construction, the cross-section of the folded gas-permeable sheets perpendicular to the longitudinal axis of the container may be in other shapes, e.g., quadrilateral, polygonal and the like.

As hereinbefore mentioned, if desired, the container elements in their box-shaped housing may be stacked upon one another in layers. A convenient means of accomplishing such stacking is to provide the individual container elements on two sides with a foot in the shape of an H-profile. The width of the profile is such that a box which has no feet can be carried on its top while on the other hand the foot at the bottom juts over the upper edges of the boxes in the lower layers. Such a construction has the advantage that proper stacking of one layer above the other prevents gases from escaping through the free spaces between the boxes without coming into contact with the solid. To this end the boxes in consecutive layers may be placed so that in one layer those boxes which are provided with feet are rotated one quarter turn with respect to the boxes with feet in a preceding layer. In this way the gases are forced to flow substantially through the solid containers.

In another embodiment of the invention, both the upper and lower edges of the side walls of at least two opposite sides of the box are bent outwards and towards each other so as to form an L-shape. In this way one box may be stacked with its flat lower edge on the flat upper edge of another box in a lower level.

An apparatus described hereinbefore is particularly suitable for use in a process in which sulfur oxides are removed from flue gases. In such a process flue gas is contacted under oxidative conditions at elevated temperature with a solid acceptor which is capable of accepting sulfur oxides, e.g., sulfur dioxide and sulfur trioxide. Preferred acceptors comprise a metal and/or metal compound of copper or vanadium supported on an alumina-containing carrier or on a carrier which consists substantially of alumina. After the acceptor has been loaded with sulfur oxides, it is regenerated with a reducing gas such as hydrogen or a hydrogen containing gas, or light hydrocarbons. As a result the metal sulfate formed is decomposed and the metal is reduced to its metallic form. The regenerated acceptor is then returned into contact with the sulfur oxides-containing gas.

We claim as our invention:

1. An apparatus for contacting a gas mixture containing undesirable compounds with a solid material suitable for removing such compounds which comprises:
   a housing provided with a gas inlet and a gas outlet;
   a system of containers for the solid material operationally disposed within said housing, said containers comprising a sheet of a gas-permeable material folded into a plurality of S-shaped creases each having two spaces, one of said spaces having inserted therein a ladder-type construction of horizontal and vertical bars which form chambers for the solid material while the second space has inserted therein a ladder-type construction of horizontal and vertical bars which form gas channels, said channels being in open fluid communication with said gas inlet and gas outlet.

2. The apparatus of claim 1 wherein the ladder-type construction in one of the spaces of the S-shaped crease is rotated 90° with respect to the ladder-type construction in the second space of said S-shaped crease.

3. The apparatus of claim 2 wherein the gas-permeable material is metal gauze.

4. The apparatus of claim 3 wherein one ladder-type construction has bars running horizontally which form chambers for the solid material and the second ladder-type construction has bars running vertically which form the open gas channels.

5. The apparatus of claim 4 wherein the ladder-type construction forming the chamber for the solid has one vertical longitudinal strip which extends outside the space of the S-shaped crease and is located opposite the closed side of the following space.

6. The apparatus of claim 5 wherein the ladder-type construction forming the open gas channels has two longitudinal strips which extend outside the space of the S-shaped crease and are located respectively above and below a chamber for the solid material.

7. The apparatus of claim 6 wherein the sheet of gas-permeable material is connected at regular intervals by welds to the ladder-type construction placed in the spaces of the creases.

* * * * *

UNITED STATES PATENT AND TRADEMARK OFFICE
CERTIFICATE OF CORRECTION

PATENT NO. : 3,747,308
DATED : July 24, 1973
INVENTOR(S) : ROELAND VERSLUIS, JACOB SCHINKELSHOEK and PIETER J. SCHUURMAN It is certified that error appears in the above-identified patent and that said Letters Patent are hereby corrected as shown below:

— Claim to Priority for the benefit of the filing date of Netherlands Patent Application No. 7101464, filed February 3, 1971. —

Signed and Sealed this

Eighth Day of April 1980

[SEAL]

Attest:

SIDNEY A. DIAMOND

*Attesting Officer*     *Commissioner of Patents and Trademarks*